US008654959B2

(12) United States Patent
Hajji et al.

(10) Patent No.: US 8,654,959 B2

(45) **Date of Patent: *Feb. 18, 2014**

(54) AUTOMATED TELEPHONE ATTENDANT

(75) Inventors: Kamil Mostafa Hajji, Irving, TX (US); Arjun Shreeram Cholkar, Allen, TX (US); Arvind Gurudas Betrabet, Plano, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/223,644

(22) Filed: Sep. 1, 2011

(65) Prior Publication Data

US 2012/0002793 A1 Jan. 5, 2012

Related U.S. Application Data

(63) Continuation of application No. 11/867,104, filed on Oct. 4, 2007, now Pat. No. 8,014,509, which is a continuation of application No. 10/671,413, filed on Sep. 25, 2003, now Pat. No. 7,295,664.

(60) Provisional application No. 60/440,214, filed on Jan. 15, 2003.

(51) Int. Cl.
*H04M 3/42* (2006.01)

(52) U.S. Cl.
USPC ................................ 379/218.01; 379/201.01

(58) Field of Classification Search
USPC ............ 379/218.01, 218.02, 211.01, 211.02, 379/212.01, 201.01, 265.01–265.14, 379/266.01–266.1
See application file for complete search history.

(56) References Cited

U.S. PATENT DOCUMENTS

| | | | |
|---|---|---|---|
| 5,222,120 | A | 6/1993 | McLeod et al. |
| 6,044,403 | A | 3/2000 | Gerszberg et al. |
| 6,373,817 | B1 | 4/2002 | Kung et al. |
| 6,400,804 | B1 | 6/2002 | Bilder |
| 6,463,130 | B1 | 10/2002 | Malik |
| 7,545,918 | B2 | 6/2009 | Edwards |
| 7,751,553 | B2 | 7/2010 | Pearson |
| 2001/0012335 | A1 | 8/2001 | Kaufman et al. |
| 2002/0114437 | A1 | 8/2002 | Nabkel et al. |
| 2002/0163999 | A1 | 11/2002 | Farris et al. |
| 2002/0168055 | A1 | 11/2002 | Crockett et al. |
| 2003/0108184 | A1 | 6/2003 | Brown et al. |
| 2003/0161464 | A1 | 8/2003 | Rodriguez et al. |
| 2003/0223403 | A1 | 12/2003 | Higgins |
| 2004/0024754 | A1 | 2/2004 | Mane et al. |
| 2004/0184593 | A1 | 9/2004 | Elsey et al. |

FOREIGN PATENT DOCUMENTS

| | | |
|---|---|---|
| WO | WO/98/57506 | 12/1998 |

*Primary Examiner* — William Deane, Jr.

(57) ABSTRACT

A telephony system (100) includes a user device (110, 130) configured to enable a user of the telephony system (100) to place and receive telephone calls, and a service node (180, 185) configured to communicate with the user device (110, 130) and to thereby provide the user with an automated voice interface to the telephony system (100) upon the user's initiating access to the telephony system (100) via the user device (110, 130). The automated voice interface permits the user to verbally specify a desired objective corresponding to any one of a number of predefined objectives, the predefined objectives including directory assisted call placement and at least one form of information retrieval. Upon receiving the desired objective from the user, the service node (180, 185) acts to implement the desired objective.

25 Claims, 4 Drawing Sheets

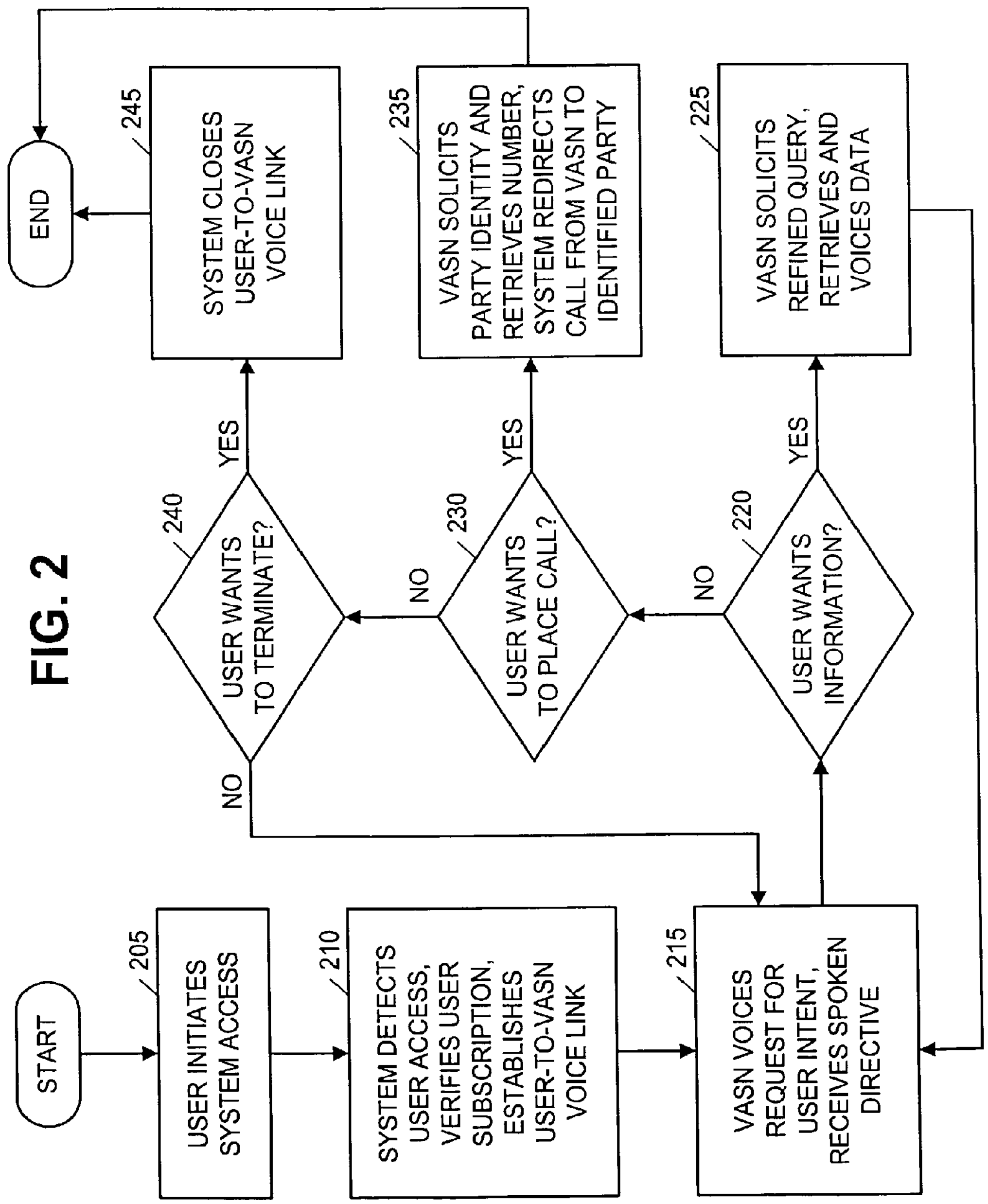
FIG. 2
START
205
USER INITIATES SYSTEM ACCESS
210
SYSTEM DETECTS USER ACCESS, VERIFIES USER SUBSCRIPTION, ESTABLISHES USER-TO-VASN VOICE LINK
215
VASN VOICES REQUEST FOR USER INTENT, RECEIVES SPOKEN DIRECTIVE
220
USER WANTS INFORMATION?
YES
NO
225
VASN SOLICITS REFINED QUERY, RETRIEVES AND VOICES DATA
230
USER WANTS TO PLACE CALL?
YES
NO
235
VASN SOLICITS PARTY IDENTITY AND RETRIEVES NUMBER, SYSTEM REDIRECTS CALL FROM VASN TO IDENTIFIED PARTY
240
USER WANTS TO TERMINATE?
YES
NO
245
SYSTEM CLOSES USER-TO-VASN VOICE LINK
END

AUTOMATED TELEPHONE ATTENDANT

RELATED APPLICATION

This is a continuation of prior U.S. patent application Ser. No. 11/867,104 filed on Oct. 4, 2007 and issuing on Sep. 6, 2011 as U.S. Pat. No. 8,014,509 which, in turn, is a continuation of issued U.S. Pat. No. 7,295,664 which, in turn, claims priority under 35 U.S.C. §119 based on U.S. Provisional Patent Application Ser. No. 60/440,214, filed Jan. 15, 2003 and entitled "System and Method for Providing Personalized Concierge Service", the disclosure of each of which is incorporated herein in its respective entirety by reference. Benefits under 35 U.S.C. §120 are hereby claimed.

BACKGROUND OF THE INVENTION

1. Field of the Invention

The present invention relates generally to telephony and, more particularly, to user interfaces within telephony systems.

2. Description of the Related Art

In the public telephony system of today, calling parties provide the telephone numbers required to complete outgoing calls. For example, in conventional wireline telephony, a calling party receives a dial tone upon going off hook (e.g., upon lifting a telephone handset), and then dials a sequence of digits associated with a destination (e.g., a receiving party) of choice. Similarly, in conventional wireless, or mobile telephony, the calling party keys in a destination-specific sequence of digits prior to dialing a unique call-activation key (e.g., "send").

As a result, telephony users must remember or record frequently called numbers, while retrieving other numbers, as needed, from paper-based, dial-up or on-line telephone directories. Although certain telephony features (e.g., in-phone memory, speed-dialing, voice-activated dialing, etc.) do aid this process, the burden of developing and maintaining telephone contact information can be objectionable, if not overwhelming, for many users. Moreover, the conventional telephony interface generally limits the user to placing and receiving calls, while doing little to enhance the user's access to other types of information and technology.

Consequently, a need exists for an improved user interface in public telephony.

SUMMARY OF THE INVENTION

Systems and methods consistent with the present invention address this and other needs by providing an interactive voice-based user interface for telephony.

In accordance with the purpose of the invention as embodied and broadly described herein, a telephony system includes a service node configured to communicate with a user device and provide a user associated with the user device with an automated voice interface to the telephony system upon the user's initiating access to the telephony system via the user device. The automated voice interface is configured to permit the user to verbally specify a desired objective corresponding to any one of a plurality of predefined objectives including directory assisted call placement and at least one form of information retrieval. Upon receiving the desired objective from the user, the service node acts to implement that objective.

In another implementation consistent with the present invention, a service node includes logic configured to communicate, via a switch, with a user device. The logic provides a user of the telephony system with an automated voice interface upon the user's initiating access to the telephony system via the user device. The automated voice interface is configured to permit the user to verbally specify a desired objective corresponding to any one of a plurality of predefined objectives including call placement and at least one form of information retrieval. Upon receiving the desired objective from the user, the service node acts to implement the desired objective.

In yet another implementation consistent with the present invention, a method of providing a user of a telephony system with an automated voice interface includes voicing a request to the user, upon the user's initiating access to the telephony system, that the user identify an intended objective; awaiting the user's response to the voiced request; selecting, based upon the user's response, one of a plurality of predefined objectives including directory assisted call placement and at least one form of information retrieval; and acting to implement the selected objective.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 2 depicts an exemplary method of providing an automated telephony user interface consistent with implementations of the present invention;

DETAILED DESCRIPTION

Figure 1:
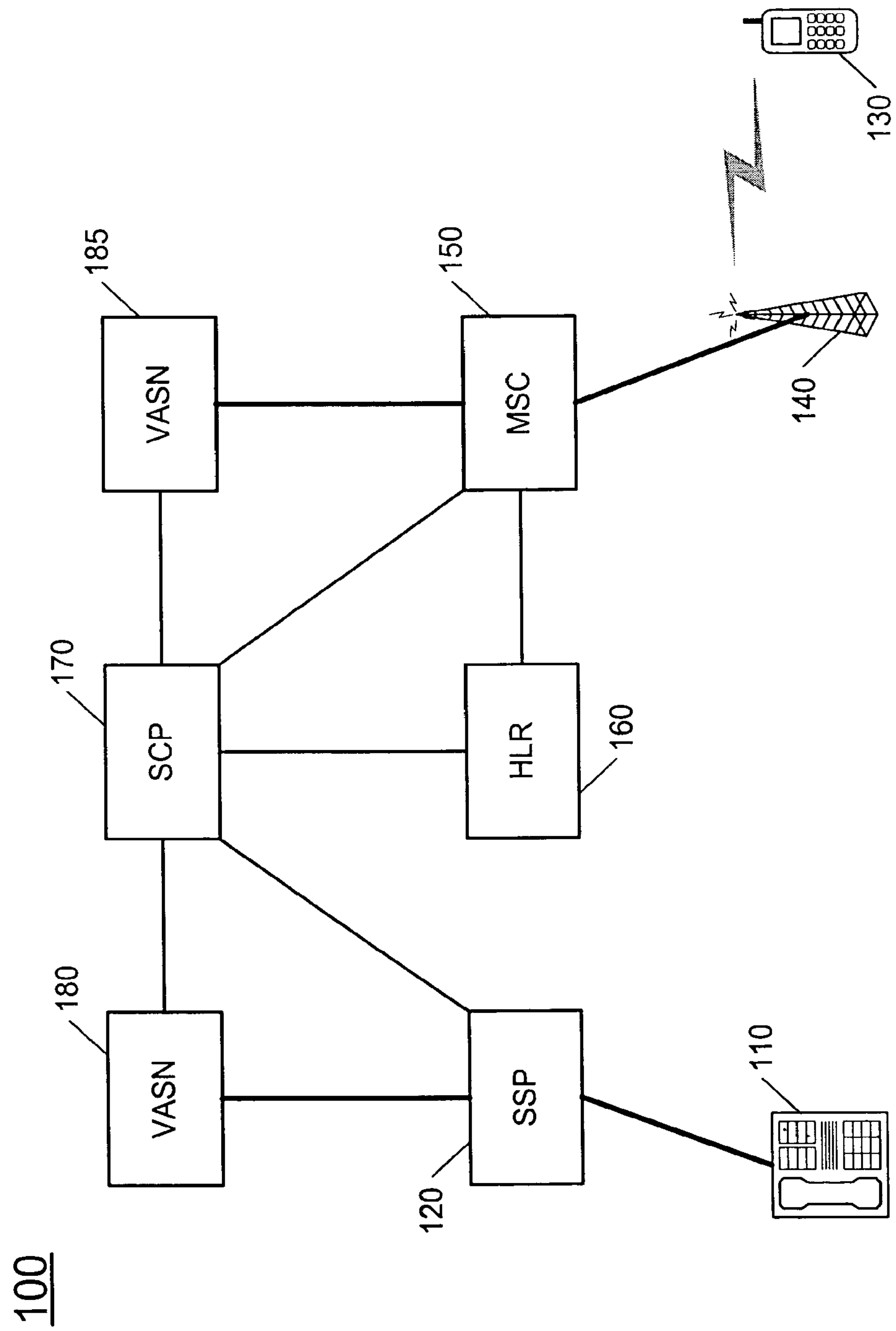
FIG. 1 depicts an exemplary telephony system consistent with implementations of the present invention.

The following detailed description of the invention refers to the accompanying drawings. The same reference numbers in different drawings may identify the same or similar elements. Also, the following detailed description does not limit the invention. Rather, the scope of the invention is defined by the appended claims and equivalents.

Generally, systems and methods consistent with the present invention provide a voice-based, rather than a key-sequence-based, user interface for telephony. Such a voice-based user interface serves as a personal telephone attendant, or personal telephone concierge, accessing and retrieving audio and/or text information based on a subscribing user's spoken instructions.

In exemplary wireline implementations, the dial tone conventionally provided by the public switched telephone network (PSTN) is replaced by a voiced greeting. In exemplary wireless implementations, the voiced greeting is presented upon the user's dialing, either manually or by voice-activation, an attendant-specific code (e.g., a short key sequence beginning With "#" or "*" and followed by "send").

Upon receiving the voiced greeting, the user states his or her desired objective. For example, the user may wish to place a directory assisted call, or may instead wish to retrieve information from a third-party source (e.g., weather, stock quotes, driving directions, etc.). Accordingly, the voice-based system interface (also referred to hereinafter as the personal attendant or, more simply, the attendant) applies speech recognition to decipher the user's statement and thereby determine the nature of the user's intent.

If necessary, the personal attendant also uses voiced instructions to solicit a further refinement of the user's objective. For example, if the user wishes to place a directory assisted call, the personal attendant may solicit the user's spoken indication of the identity of the receiving party. Alternatively, if the user wishes to retrieve third-party information, the personal attendant may solicit the user's spoken indication of the precise nature of that information.

Upon determining the user's specific objective, the personal attendant retrieves the relevant information from an appropriate source (e.g., from a local or remote telephone directory database, or from a third-party vendor database) and acts to carry out the user's intent. For example, when the user wishes to place a call, the personal attendant can provide the destination number to the user's originating telephone switch so that the call can proceed automatically to completion. Alternatively, when the user requests third-party information, the personal attendant can voice the retrieved data back to the user. In such case, audio data (e.g., ".wav" or other audio format files) are played directly for the user, while other data are first converted to audio form (e.g., via text-to-speech (TTS) technology) before being played for the user.

Advantageously, systems and methods consistent with present invention free the user from having to remember or record telephone numbers. Through simple verbal interactions with the personal attendant, the user can place calls and gain access to a wide variety of information just by picking up a telephone handset, and without ever having to dial a destination number.

Exemplary System

FIG. 1 depicts an exemplary telephony system 100 in which the principles of the present invention can be implemented. As shown, system 100 includes a wireline user device 110, a service switching point (SSP) 120, a wireless user device 130, a wireless base station 140, a mobile switching center (MSC) 150, and a home location register (HLR) 160. Additionally, system 100 includes a service control point (SCP) 170, as well as first and second voice-attendant service nodes (VASNs) 180, 185.

Wireline user device 110 may be any known type of wireline telephone. For example, wireline device 110 can be a conventional dual-tone multiple-frequency (DTMF) telephone located on a customer premises and coupled to a central telephone office via a twisted wire pair. Alternatively, and again by way of example, wireline device 110 can be an integrated services digital network (ISDN) telephone, located on customer premises and coupled to a central phone office via either an ISDN basic rate interface (BRI) or an ISDN primary rate interface (PRI).

SSP 120 may be any known type of wireline telephony switch. For example, SSP 120 can be a conventional central office switch, providing multiple wireline customers access to the PSTN. By selectively connecting to other similar switches (not shown), such a central office switch can couple a local device (e.g., wireline device 110) to any other device connected to the PSTN. Routing between such switches can be carried out, for example, via the well known Signaling System No. 7 (SS7).

Wireless user device 130 may be any known type of wireless telephone, and base station 140 can be any suitable wireless transceiver. For example, wireless device 130 and base station 140 can communicate via well known time-division multiple-access (TDMA), frequency-division multiple-access (FDMA), and/or code-division multiple-access (CDMA) techniques.

MSC 150 may be any known type of wireless telephony switch. Much as SSP 120 serves wireline user device 110, MSC 150 serve wireless user device 130 (e.g., by providing access to the PTSN). Indeed, in certain implementations, MSC 150 may perform functions for wireless user device 130 that are similar to those performed by SSP 120 for wireline user device 110.

HLR 160 may be any suitable mobile tracking database (e.g., a dynamic database maintained on a computer server situated at a site owned by a mobile system operator). As is well known in the art, HLR 160 works in combination with other similar registers (not shown) to track the location of wireless device 130 (i.e., since wireless device 130 is free to roam and thus communicate via other base stations and switching centers not shown).

SCP 170 may be any device capable of providing data, from a database and/or other digital services, to telephony switches such as SSP 120 and MSC 150. By way of example, and as is well known in the art, such devices are commonly used to provide services such as 800-number dialing, credit card verification, etc.

Each of VASNs 180 and 185 may be any processing device (e.g., a dedicated computer and/or computer server) capable of providing the hereinafter described functionality of the telephone voice attendant of the present invention. Each of VASNs 180 and 185 may include one or more control interfaces for communicating with SCP 170, SSP 120 and/or MSC 150. For sake of clarity, VASN 180 is shown and hereinafter described as providing voice-attendant services for a user of wireline device 110, while VASN 185 is shown and hereinafter described as providing voice-attendant services for a user of wireless device 130. However, as will be apparent to those of ordinary skill in the art, a single service node can be configured to provide voice-attendant services to both users.

In addition, it should be understood that a single VASN can provide services for a number of users. Further, each of VASNs 180 and 185 may be implemented in hardware, software, or any combination of hardware and/or software, and is not limited to any specific combination of hardware circuitry and/or software. When implemented in software, VASNs 180 and 185 may include one or more processors that execute sequences of instructions contained in a computer-readable medium to perform the process described hereafter. The computer readable medium may be part of VASNs 180 and 185 or located external to VASNs 180 and 185. When implemented in hardware, VASNs 180 and 185 may include hardwired circuitry for performing the process described hereafter. In each case, VASNs 180 and 185 may include one or more interfaces for communicating with SSP 120, MSC 150, and/or SCP 170.

Exemplary system 100 may, by way of example and without limiting the scope of the present invention, be configured to operate in accordance with the well known Advanced Intelligent Network (AIN) protocols, developed by Telcordia (formerly Bellcore). AIN is a North American industry standard telephone network architecture that separates service logic from switching equipment, thereby allowing for the addition of system services without requiring switch design changes (see, for example, Telcordia AIN Release 0.2 (AIN0.2)).

To achieve AIN compliance, certain components of system 100 can communicate in accordance with suitable industry standard protocols. For example, communications between SSP 120 and SCP 170 may conform to Telcordia Generic Requirement 1299 (GR-1299), while communications between SSP 120 and VASN 180 may conform to Telcordia Generic Requirement 1129 (GR-1129).

Additionally, communications between SCP 170 and VASN 180 may conform to Telcordia Special Report 3511 (SR 3511). Communications between components impacting the wireless portion of system 100 (e.g., among MSC 150, HLR 160, SCP 170, and VASN 185) may conform to Electronics Industries Association (EIA) Interim Standard 41 (IS-41).

System 100 may also be configured, again by way of example, to operate in accordance with the international version of AIN. The international intelligent network standard is developed by the International Telecommunications Union (ITU) and generally endorses the concepts of AIN (see, for example, ITU Capability Set 2, or simply ITU-CS2). In such a case, the various components of system 100 can communicate via industry standard protocols set forth in the well known ITU Intelligent Network Application Protocol (INAP) core capability descriptions.

In FIG. 1, heavy lines between components indicate voice-and-data communication paths, while lighter lines between components indicate data-only communication paths. Additionally, a lightning strike between wireless device 130 and base station 140 indicates a wireless voice-and-data communication path. In other implementations consistent with the present invention, any combination of wired, wireless and optical communication paths may exist between the components in FIG. 1, and any path may communicate any combination of voice and/or data.

Exemplary Processing

A user of wireline device 110 initiates access to system 100 by taking device 110 off hook (e.g., by lifting a telephone handset, or by pushing a "talk" button). SSP 120 then detects the off hook condition and, rather than providing a dial tone to the user and waiting for the user to key in a destination telephone number, sends an alert message to SCP 170 (i.e., a message indicating that device 110 has gone off hook).

SSP 120 may, for example, implement a call-processing model specified by AIN. According to such a model, each telephone call is treated as a sequence of logical steps, each step (or at least certain steps) including a trigger detection point that can be enabled for a subscribing user (e.g., based on a subscription profile available at SCP 170). In an exemplary implementation, a trigger detection point can be enabled at SSP 120, for wireline device 110, so that an alert message is sent from SSP 120 to SCP 170 immediately upon the user's taking device 110 off hook.

Upon receiving the alert message from SSP 120, and upon verifying a voice-attendant subscription for wireline device 110, SCP 170 sends a message back to SSP 120, requesting that SSP 120 connect to VASN 180. Consequently, SSP 120 establishes a voice path between wireline device 110 and VASN 180, and voiced interaction between the user of device 110 and VASN 180 can begin.

Initially, VASN 180 voices a greeting (e.g., "Hello. How can I help you?") and awaits a verbal response from the user. The user's response can be directed to any one of a number of predefined objectives supported by VASN 180. For example, VASN 180 may, at a minimum, support directory assisted call placement and at least one form of information retrieval (e.g., retrieval of bank account data, weather information, stock market quotes, driving directions, Internet search results, personal contact and scheduling data, utility order status, e-mails, etc.).

Accordingly, VASN 180 applies automated speech recognition to decipher the user's response and determine which of the supported objectives the user intends. For example, a user response of "Call" or "Directory" can be mapped to directory assisted call placement, while a user response of "Data" or "Info" can be mapped to a particular (e.g., user preferred) form of information retrieval. Other, more targeted responses (e.g., "Bank", "Weather", "Stocks", "Directions", "Web Search", "Contact", "Appointment", "Order Status", etc.) can be mapped to other supported forms of information retrieval, and undecipherable responses can evoke a suitable voiced error message (e.g., "I'm sorry. I did not understand you. Please try again.").

Once the user's objective is determined, VASN 180 may, if necessary, voice additional instructions to the user in order to solicit the user's spoken refinement of his or her intent. For example, if VASN 180 determines that the user wants directory assisted call placement, VASN 180 may voice a request for the geographic location (e.g., city and state) and identity (e.g., given name and surname) of the destination the user wishes to reach. Or, as another example, if VASN 180 determines that the user wishes to perform an Internet search, VASN 180 may voice a request for search terms and, optionally, a preferred search engine. As a further example, if VASN 180 determines that the user wishes to retrieve e-mail messages, VASN 180 may request the user's account information, service provider information, etc.

Upon determining the user's precise intent, VASN 180 acts to carry out that intent. For example, in an instance of directory assisted call placement, VASN 180 may retrieve a telephone number for the identified destination (e.g., from a directory database, either local or remote) and return the number to SSP 120 so that the user's call can proceed automatically to completion. Alternatively, in an instance of information retrieval (e.g., when the user has requested an Internet search or stock market data), VASN 180 can retrieve the requested data (e.g., from a local database, or from an outside service provider) and voice it back to the user (e.g., by way of a TTS system).

Thus, through straightforward voice interaction with VASN 180, a user of wireline device 110 can place calls and access various types of information just by picking up a telephone handset. There is never a need for the user to remember or record telephone numbers.

Turning now to the wireless portion of system 100, a user of wireless device 130 initiates access to system 100 by dialing (either manually or by voice activated dialing) a brief attendant-specific code (e.g., a # code or a * code, followed by "send"). Upon receiving the code and recognizing that the user wants the voice attendant, MSC 150 sends a message to SCP 170, requesting that SCP 170 locate VASN 185. Then, upon receiving the location of VASN 185, MSC 150 connects wireless device 130 with VASN 185, and voiced interaction between the wireless user and VASN 185 can commence as described above in the wireline context.

FIG. 2 depicts the above described operation of system 100 in flowchart form. In FIG. 2, call processing begins when a user initiates system access (e.g., by taking wireline device 110 off hook, or by keying in an attendant-specific code on wireless device 130) (act 205). Thereafter, the telephony system detects that the user has initiated access (e.g., SSP 120 detects that wireline device 110 has gone off hook, or MSC 150 receives the attendant-specific code from wireless device 130), verifies the user's voice-attendant subscription (e.g., SCP 170 confirms that wireline device 110, or wireless device 130, is associated with a valid subscriber account), and establishes a user-to-attendant voice link (e.g., SSP 120 connects wireline device 110 to VASN 180, or MSC 150 connects wireless device 130 to VASN 185) (act 210).

Once the user-to-attendant voice link is established, the VASN voices a request that the user state his or her intended objective (e.g., VASN 180 voices a greeting to a user of wireline device 110, or VASN 185 voices a greeting to a user of the wireless device 130) (act 215). Upon receiving the user's spoken response, the attendant (i.e., either VASN 180, or VASN 185, as appropriate) applies speech recognition to assess the user's intent. For example, the VASN can determine whether the user intends information retrieval, directory assisted call placement, or session termination (acts 220, 230, 240).

If the VASN determines that the user wants information retrieval (e.g., Internet search results, market statistics, weather forecasts, etc.). then the VASN can solicit further refinement of the user's intent before retrieving and voicing the relevant data back to the user (act 225). Alternatively, if the VASN determines that the user wants directory assisted call placement, then the VASN can solicit the location and identity of the intended destination before retrieving a corresponding telephone number and routing the user's call (act 235).

If the VASN determines that the user wants neither information retrieval, nor directory assisted call placement, and instead prefers to terminate the voice-attendant session, then the VASN can simply end the call (e.g., tear down the user-to-attendant voice link and end processing) (act 245). Or, if the VASN is unable to determine the user's intent, the VASN can simply state as much and request that the user try again (return to act 215).

Figure 3:
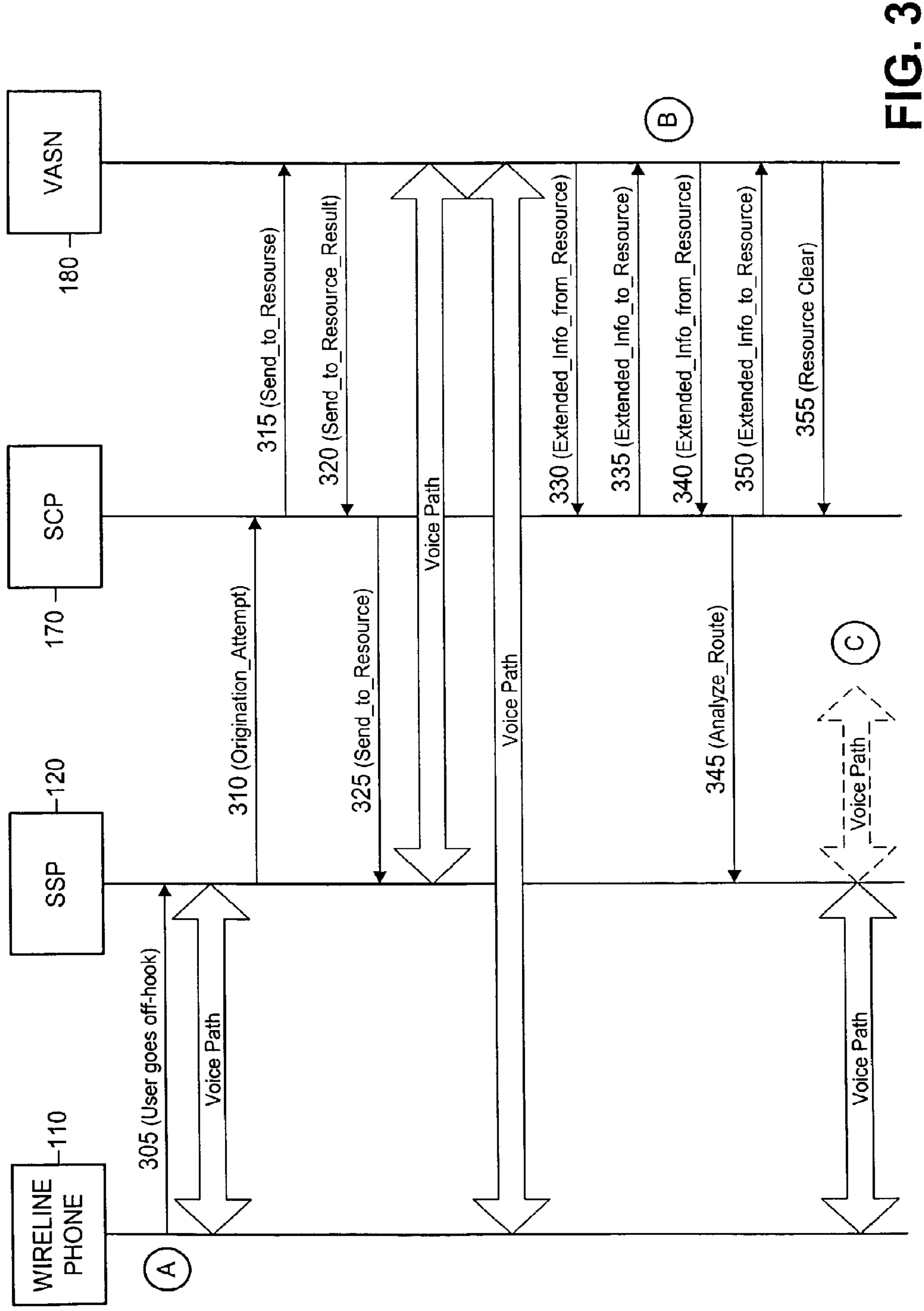
FIG. 3 depicts an exemplary wireline call flow consistent with implementations of the present invention.
Figure 4:
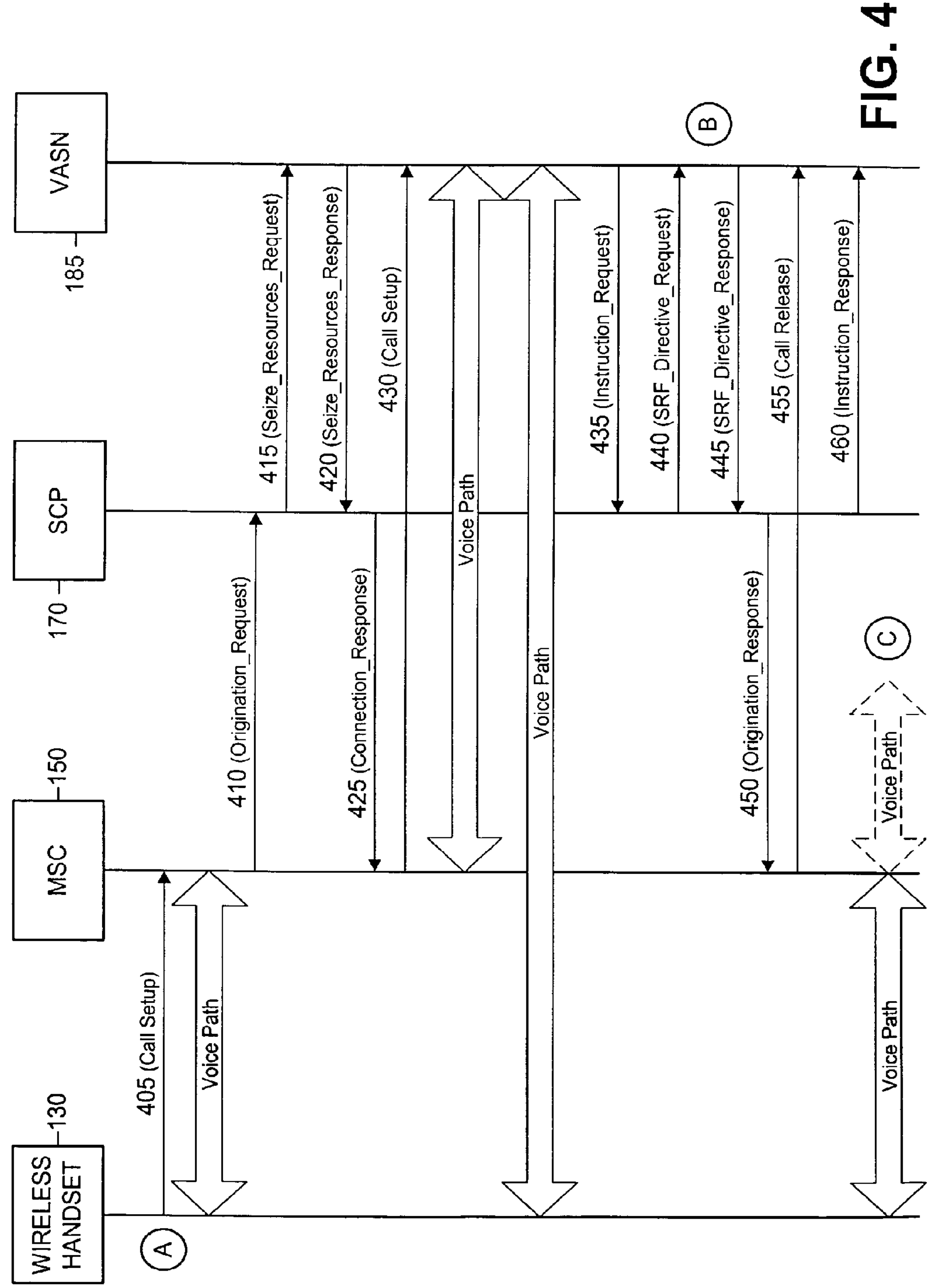
FIG. 4 depicts an exemplary wireless call flow consistent with implementations of the present invention.

To further illuminate operation of exemplary system 100, FIGS. 3 and 4 depict exemplary call flows, or message flows, between system components. FIG. 3 depicts call flow in the wireline context, while FIG. 4 depicts analogous call flow in the wireless context. In FIGS. 3 and 4, AIN-compliant messages (e.g., messages conforming to GR-1129, GR-1299 and SR-3511 for FIG. 3, and messages conforming to IS-41 for FIG. 4) are shown for purposes of illustration and do not limit the scope of the present invention.

In FIG. 3, processing begins (at a point indicated by an encircled letter A) when a user takes wireline device 110 off hook and thus establishes a voice path between wireline device 110 and SSP 120 (act 305). Upon detecting the off hook condition of device 110, SSP 120 sends an alert message (e.g., an AIN Origination_Attempt message) to SCP 170 (act 310). The alert message can, for example, include a subscriber number (e.g., a telephone number) associated with wireline device 110.

Upon receiving the alert message from device 110, SCP 170 verifies that device 110 is a voice-attendant subscriber and sends an alert message (e.g., an AIN Send_to_Resource message) to VASN 180, requesting that VASN 180 reserve a communication channel, or port, for upcoming exchanges with device 110 (act 315). In response, VASN 180 sends an answer message (e.g., an AIN Send_to_Resource_Result message) back to SCP 170, providing an appropriate port number (act 320).

Upon receiving the port number from VASN 180, SCP 170 relays it back to SSP 120 (e.g., via an AIN Send_to_Resource message) (act 325). Consequently, a voice path is established between wireline device 110 and VASN 180.

VASN 180 then sends a confirmation (e.g., an AIN Extended_Info_from_Resource message) to SCP 170, indicating that the voice path to wireline device 110 is active (act 330). SCP 170 sends an acknowledgement (e.g., via an AIN Extended_Info_to_Resource message) to VASN 180, indicating that VASN 180 can proceed (act 335).

At such time (as indicated by an encircled letter B), VASN 180 engages in voiced interaction with the user of wireline device 110. For example, as described in detail above, VASN 180 can play a greeting to the user and then collect data based on the user's verbal response to the greeting. For sake of the illustrative example of FIG. 3, the user is presumed to request directory assisted call placement to a stated destination of his or her choice.

Accordingly, VASN 180 retrieves a telephone number for the stated destination (e.g., from a directory database, either local to or remote from VASN 180, as described above) and returns the number to SCP 170 (e.g., via an AIN Extended_Info_from_Resource message) (act 340). SCP 170 then passes the phone number back to SSP 120 (e.g., via an AIN Analyze_Route message) (act 345) and sends an acknowledgement (e.g., an AIN Extended_Info_to_Resource message) back to VASN 180 (act 350).

VASN 180 then relinquishes the voice path to SSP 120 and breaks communication with SCP 170 (e.g., via an AIN Resource Clear message). At the same time (as indicated by an encircled letter C), SSP 120 uses the destination number to complete the user's call (i.e., to route the call from device 110 to the destination).

In FIG. 4, processing begins (at a point indicated by an encircled letter A) when a user of wireless device 130 keys in an attendant-specific code and thus causes device 130 to establish a voice path to MSC 150 (e.g., via an IS-41 Call Setup message) (act 405). Subsequently, MSC 150 sends a message (e.g., an IS-41 Origination_Request message) to SCP 170 (act 410). The message can, for example, include a subscriber number (e.g., a telephone number) associated with wireless device 130.

SCP 170 then verifies that device 130 is a voice-attendant subscriber and sends an alert message (e.g., an IS-41 Seize_Resources_Request message) to VASN 185, requesting that VASN 185 reserve a communication channel for upcoming exchanges with device 130 (act 415). In response, VASN 185 sends an answer message (e.g., an IS-41 Seize_Resources_Response message) to SCP 170, indicating the channel for exchanges between wireless device 130 and VASN 185 (act 420).

Upon receiving the channel from VASN 185, SCP 170 relays it back to MSC 150 (e.g., via an IS-41 Connection_Response message) (act 425). MSC 150 then uses the channel to establish a voice path between wireless device 130 and VASN 185 (e.g., via an IS-41 Call Setup message) (act 430).

Thereafter, VASN 185 sends a message (e.g., an IS-41 Instruction_Request message) to SCP 170, indicating that the voice path to wireless device 130 is active (act 435). SCP 170 then instructs VASN 185 to proceed with voice-attendant services (e.g., by way of an IS-41 SRF_Directive_Request message) (act 440).

At such time (as indicated by an encircled letter B), VASN 185 engages in voiced interaction with the user of wireless device 130. For example, as described in detail above, VASN 185 can play a greeting to the user and then collect data based on the user's verbal response. For sake of the illustrative example of FIG. 4, the user is presumed to request directory assisted call placement to a stated destination of his or her choice.

Accordingly, VASN 185 retrieves a telephone number for the stated destination and returns that number to SCP 170 (e.g., via an IS-41 SRF_Directive_Response message) (act 445). SCP 170 then passes the number back to MSC 150 (e.g., via an IS-41 Origination_Response message) (act 450).

Subsequently, MSC 150 and SCP 170 break communications with VASN 185 (e.g., via an IS-41 Call Release message and an IS-41 Instruction_Response message, respectively (acts 455, 460). Additionally (as indicated by an encircled letter C), MSC 150 uses the destination number to complete the user's call (i.e., to route the call from wireless device 130 to the chosen destination).

In the foregoing description of the exemplary embodiments of FIGS. 1 through 4, voice-attendant services (e.g., services provided by VASNs 180, 185) are, for ease of discussion, limited to directory assisted call placement and information retrieval. Those of ordinary skill in the art will immediately recognize, however, that such services can also include various other forms of taking action. For example, via coordination with appropriate service providers, voice-attendant services consistent with the present invention can include order placement (e.g., to effect changes in services provided by utility companies), database modification (e.g., to effect changes in user profile information at financial institutions), database synchronization (e.g., to match personal contact and scheduling information between a user's office computer and his or her personal digital assistant), and message transmission (e.g., to create and send voice-mail and/or e-mail messages).

Voice-attendant services consistent with the present invention can also include forms of direct voice-activated call placement. For example, user commands such as "Mom", "Dad", "John", "Mechanic", "Pharmacy", "Police", etc. can be reserved for fast access to frequently called and/or critical destinations. Moreover, voice-attendant services can include various forms of user assistance (e.g., to accommodate user requests for explanations of available voice-attendant services) and/or user programming (e.g., to allow a user to set up the aforementioned direct voice-activated call placement commands, or to allow the user to customize certain voice-attendant interface features, such as the language or gender of the attendant's voice).

Conclusion

Systems and methods consistent with the present invention provide an interactive voice-based user interface for telephony. Such a voice-based user interface serves as a personal telephone attendant, or personal telephone concierge, placing calls and/or retrieving a wide variety of information in accordance with a subscribing user's spoken instructions.

Advantageously, systems and methods consistent with present invention free the user from having to remember or record telephone numbers. Through verbal interactions with the personal concierge, the user can place calls and gain access to a wide variety of information just by picking up a telephone handset, and without ever having to dial a destination number.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described with regard to certain of the figures, the order of the acts can be varied in other implementations consistent with the present invention, and non-dependent acts can be implemented in parallel.

No element, act, or instruction used in the description of the present invention should be construed as critical or essential to the invention unless explicitly described as such. As used herein, the article "a" is intended to include one or more items. Where only one item is intended, the term "one" or similar language is used.

The scope of the invention is not limited to the foregoing description, and is instead defined by the appended claims and their equivalents.

What is claimed is:

1. A system comprising:

a service node configured to communicate with a user device and provide a user associated with the user device with an automated voice interface upon the user's initiating access to the system via the user device, wherein, when the user verbally specifies a desired objective relating to information retrieval by retrieval of Internet search results, the service node is configured to request, by voiced instruction, the user's verbal specification of a preferred Internet search engine.

2. The system according to claim 1, wherein the user device is a wireline telephone, and wherein the user initiates access to the system by taking the wireline telephone off hook.

3. The system according to claim 1, wherein the user device is a wireless telephone, and wherein the user initiates access to the system by dialing a predefined key sequence.

4. The system according to claim 1, further comprising:

a switch coupled to the user device and the service node, the switch being configured to detect the user's initiating access to the system via the user device.

5. The system according to claim 4, wherein the switch is at least one of a service switching point and a mobile switching center.

6. The system according to claim 4, further comprising:

a service control system in communication with both the switch and the service node;

wherein the switch is configured to pass information identifying the user device to the service control system upon detecting the user's having initiated access to the system via the user device.

7. The system according to claim 6, wherein the service control system is configured to verify a voice interface service subscription for the user device prior to setting up a communication channel between the service node and the user device.

8. The system according to claim 6, wherein the switch, the service control point, and the service node communicate in accordance with Advanced Intelligent Network protocols.

9. The system according to claim 1, wherein when the user specifies a desired objective of directory assisted call placement, the service node is configured to:

request, by voiced instruction, the user's verbal specification of a destination, retrieve a telephone number associated with the verbally specified destination, and initiate connection of the user device to a device corresponding to the retrieved number.

10. The system according to claim 1, wherein the at least one form of information retrieval includes at least one of retrieval of Internet search results, retrieval of market results, retrieval of driving directions, retrieval of weather conditions, retrieval of account data, retrieval of personal contact information, retrieval of e-mail messages, and retrieval of service order status.

11. The system according to claim 1, wherein, when the user specifies a desired objective relating to information retrieval, the service node is configured to:

request, by voiced instruction, the user's verbal specification of an information item, retrieve the verbally specified information item from an information source, and voice the information item to the user via the user device.

12. The system according to claim 1, wherein the plurality of predefined objectives includes at least one of direct voice-activated call placement, placing an order, modifying a database, synchronizing two or more databases, and sending a message.

13. The system according to claim 12, wherein when the user specifies a desired objective corresponding to a particular instance of direct voice-activated call placement, the service node is configured to initiate connection of the user device to a destination device associated with the particular instance of direct voice-activated call placement.

14. A computerized method comprising:

voicing a request to a user, upon the user's initiating access to a communication system, that the user select an intended objective, said voicing and said initiating implemented by operation of a computer;

awaiting the user's response to the voiced request;

wherein when the selected objective relates to information retrieval by retrieval of Internet search results, acting to implement the selected objective by requesting, by voiced instruction, the user's verbal specification of a preferred Internet search engine.

15. The method of claim 14, wherein the information retrieval includes at least one of retrieval of Internet search results, retrieval of market results, retrieval of driving directions, retrieval of weather conditions, retrieval of account data, retrieval of personal contact information, retrieval of e-mail messages, and retrieval of service order status.

16. The method of claim 14, wherein, when the selected objective is directory assisted call placement, the acting to implement the selected objective includes:

voicing, to the user a request that the user verbally identify a destination, retrieving a telephone number associated with the destination, and using the retrieved number to initiate a call between the user and the destination.

17. The method of claim 14 wherein, when the selected objective is related, to information retrieval the acting to implement the selected objective includes:

request, by voiced instruction, the user's verbal specification of an information item, retrieve the verbally specified information item from an information source, and voice the information item to the user via the user device.

18. The method of claim 14, further comprising:

receiving a request from a user device to initiate access to the communication system;

verifying a voice interface service subscription for the user device prior to voicing, the request.

19. The method of claim 14, wherein the intended objective is one of a plurality of predefined objectives which includes at least one of direct voice-activated call placement, placing an order, modifying a database, synchronizing two or more databases, and sending a message.

20. The method of claim 19, wherein if the intended objective corresponds to a particular instance of said direct voice-activated call placement, the acting to implement the particular instance of the intended objective includes initiating connection of the user device to a destination device associated with the particular instance of said direct voice-activated call placement.

21. A system comprising:

a switch, the switch providing access for a user device;

a service control system providing access to a user database; and a service node in communication with the switch and the service control system, the service node comprising:

logic configured to communicate with the user device and to provide a user of the system with an automated voice interface upon the user's initiating access to the system via the user device, wherein when the user specifies a desired objective relating to information retrieval by retrieval of Internet search results, the service node is configured to request, by voiced instruction, the user's verbal specification of a preferred Internet search engine.

22. The system of claim 21, wherein the switch includes a service switching point, the service control system includes a service control point, and communication between the switch, service control system and service node is in accordance with Advanced Intelligent Network protocols.

23. The system of claim 21, wherein the switch is configured to detect the user's initiating access to the system via the user device and transmit a first message to the service control system as a result of the initiating; and wherein the service control system is configured to receive the first message, determine whether the user is a voice interface service subscriber, and send a second message to the switch to cause the establishment of a link between the user device and the service node when the user is determined to be a subscriber.

24. The system of claim 23, wherein the first message includes an identifier associated with the user device.

25. The system of claim 23, wherein the service control system is further configured to send a third message to the service node indicating a request for communication, the service node is further configured to, in response to the third message, transmit a port number to the service control system, and wherein the service control system includes the port number in the second message.

* * * * *